US006361359B1

United States Patent
Du et al.

(10) Patent No.: US 6,361,359 B1
(45) Date of Patent: Mar. 26, 2002

(54) BATTERY CONNECTOR WITH A SWITCH

(75) Inventors: Shao Ping Du; Liqi Liu; Jian Qiang Zhang, all of Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/879,684

(22) Filed: Jun. 11, 2001

(30) Foreign Application Priority Data

Apr. 30, 2001 (TW) ........................................ 90206962 U

(51) Int. Cl.[7] .............................................. H01R 3/00
(52) U.S. Cl. ......................................... 439/500; 429/97
(58) Field of Search ........................... 439/500; 429/96, 429/97, 98, 99, 100

(56) References Cited

U.S. PATENT DOCUMENTS 6,114,625 A * 9/2000 Hughes et al. ................. 429/97
6,274,266 B1 * 8/2001 Wang ............................ 429/97

* cited by examiner

Primary Examiner—Tho D. Ta
(74) Attorney, Agent, or Firm—Wei Te Chung

(57) ABSTRACT

A battery connector in accordance with the present invention includes an insulative housing (20), a plurality of terminals (21) and a detecting contact (22) received in the housing. Each terminal has an engaging portion (210), a curved portion (212) extending out of the housing and a contacting portion (213). The detecting contact has an engaging portion (220) and a contacting portion (222), the contacting portion electrically connected with the curved portion of an associated terminal during normal use of a battery and, when the battery is about to be removed, the associated terminal disconnecting from the contacting portion of the detecting contact before the terminals disconnect from the battery.

15 Claims, 4 Drawing Sheets

BATTERY CONNECTOR WITH A SWITCH

FIELD OF THE INVENTION

The present invention relates to an electrical connector, especially to a battery connector with a switch.

BACKGROUND OF THE INVENTION

With functions of an electronic device increasing, the need for battery power will be correspondingly increased. The recent trend has been to use multiple batteries within a single electronic device. For example, a personal digital assistant (PDA) is powered by two rechargeable batteries in most cases.

However, power is drawn from only one battery at a time. When the battery currently in use is down to a certain level of its power, for example, 10% of the rated power, the PDA will switch over to another fully charged battery through software and electronics. Then a user will remove the used battery for recharging. But, if the user removes battery by mistake, the PDA will lose power and any unsaved data will be lost.

Hence, an improved battery connector is needed to overcome the above-mentioned deficiencies.

SUMMARY OF THE INVENTION

Accordingly, the primary object of the present invention is to provide a battery connector having a detecting contact for detecting whether the battery is about to be removed by mistake.

Another object of the present invention is to provide a switch assembly having a detecting contact to detect that a battery is about to be removed before all the terminals break connection with the battery entirely.

A battery connector in accordance with the present invention comprises an insulative housing having a plurality of passageways therein, a plurality of terminals and a detecting contact received in the passageways of the insulative housing. Each terminal has a horizontal engaging portion, a curved portion extending out of the insulative housing and a contacting portion. The detecting contact has a horizontal engaging portion which electrically connects with the contacting portion of an associated terminal during normal use of a battery and, when the battery is about to be removed, the associated terminal disconnecting from the contacting portion of the detecting contact before the terminals disconnect from the battery.

Another battery connector in accordance with the present invention comprises an insulative housing having a plurality of passageways therein, a plurality of terminals and a detecting contact received in the passageways of the insulative housing. Each terminal has an engaging portion, a curved portion reversely extending from the engaging portion. The curved portion has a contacting portion at a lower section thereof and a dome formed on the contacting portion of an associated terminal. The detecting contact has an engaging portion, an inclined contacting portion bent down having a dome thereon for electrically connecting with the dome on the contacting portion of the associated terminal during normal use of a battery and, when the battery is about to be removed, the associated terminal disconnecting from the contacting portion of the detecting contact before the terminals disconnect from the battery.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
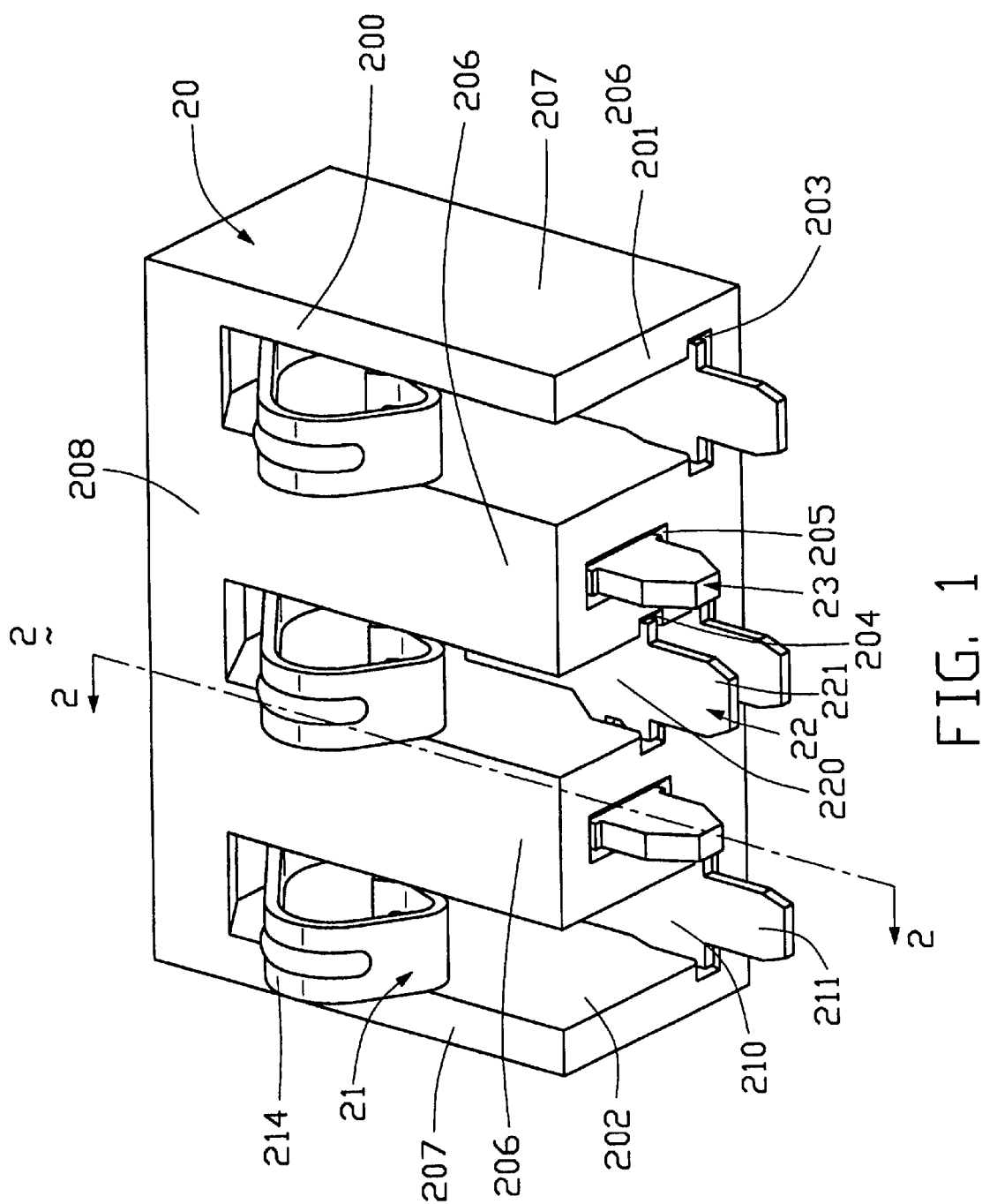
FIG. 1 is an assembly view of a battery connector in accordance with the present invention.

Referring to FIG. 1, a battery connector 2 in accordance with the present invention comprises an insulative housing 20, a plurality of terminals 21, a detecting contact 22 and a pair of conductive insertion members 23.

The housing 20 includes a mounting surface 201, a mating surface 208, a pair of opposite side walls 207, a plurality of passageways 202 and a pair of partitions 206 between two adjacent passageways 202. The passageways 202 are exposed to the mounting surface 201 and the mating surface 208. A pair of slots 203 extend inwardly in a lower end of two opposite sides of each passageway 202 and in communication with each passageway 202. A pair of slots 204 are defined in opposing lateral sides of two adjacent partitions 206 above the corresponding slot 203 and in communication with the passageway 202. A hole 205 is defined in each partition 206 and exposed to the mounting surface 201 of the housing 20.

Figure 2:
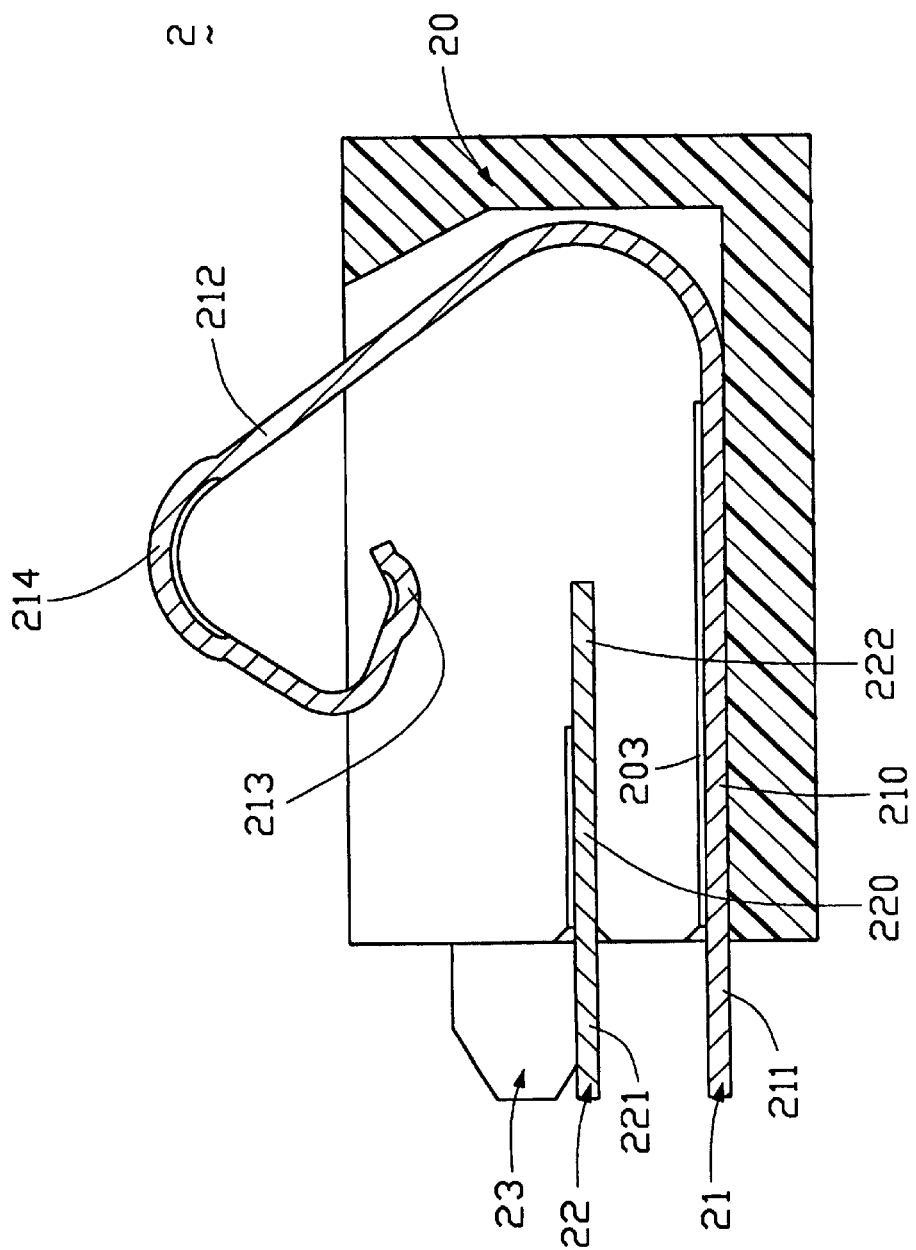
FIG. 2 is a section view of the of FIG. 1 via 2—2.

With reference to FIG. 2, each terminal 21 has a horizontal engaging portion 210, a narrow soldering portion 211 extending from a front end of the engaging portion 210, and a curved portion 212 at a rear end of the engaging portion 210. Each curved portion 212 has an apex 214 at an upper section thereof for connecting with the battery 4 (show in FIG. 3) and a contacting portion 213 at a lower section of an end of the curved portion 212. The contacting portion 213 of the central terminal 21 is for connecting with the detecting contact 22, as will be further described later.

The detecting contact 22 has a horizontal engaging portion 220, a narrow soldering portion 221 at a front end thereof and a contacting portion 222 at a rear end thereof. The detecting contact 22 is planar.

Referring to FIGS. 1 and 2, in assembly, the terminals 21 are inserted in the passageways 202 of the insulative housing 20. The detecting contact 22 is received in the slots 204 of the insulative housing 20. The horizontal engaging portions 210, 220 of the terminals 21 and detecting contact 22 are received in the corresponding slots 203, 204 of the insulative housing 20. The insertion members 23 are inserted into the corresponding holes 205.

Figure 3:
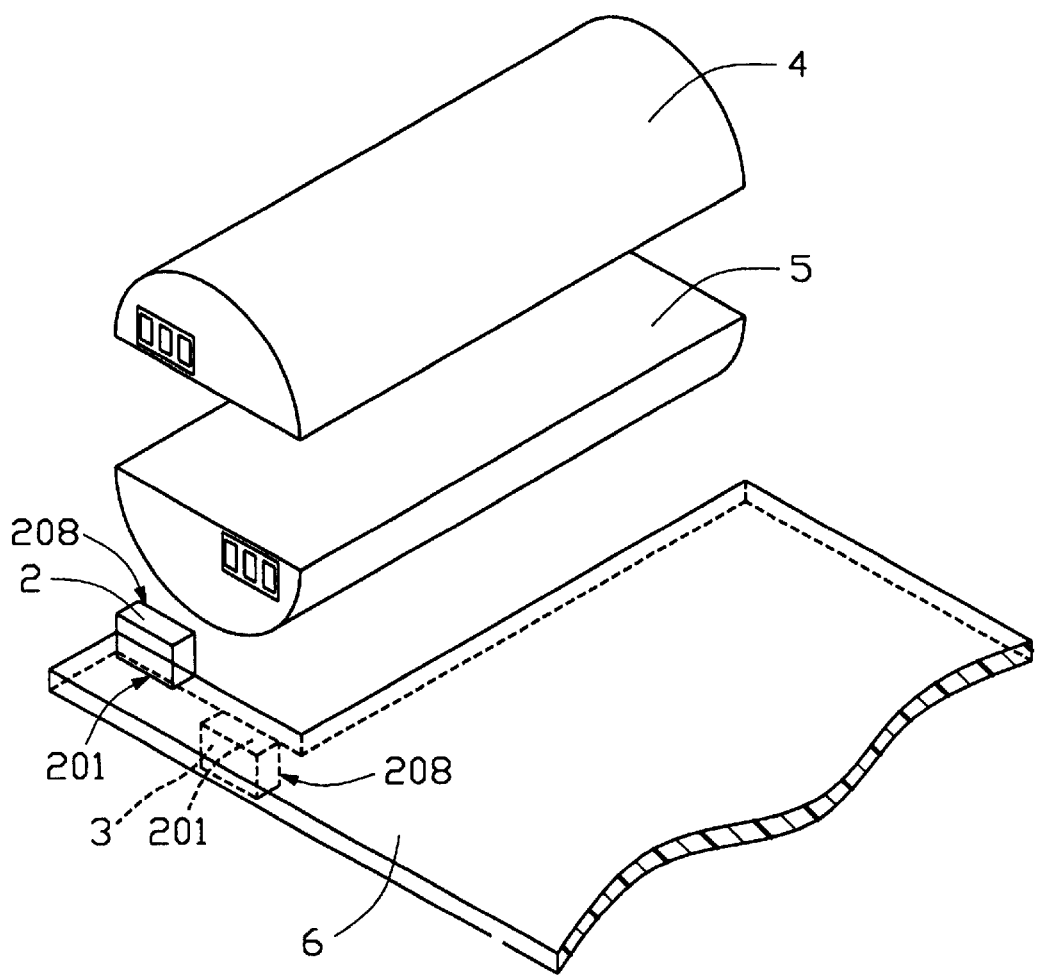
FIG. 3 is an assembly view of two battery connectors of FIG. 1, two batteries and a printed circuit board.

Further referring to FIG. 3, in use, the soldering portions 211, 221 of the terminals 21 and the detecting contact 22 are respectively soldered to a printed circuit board (PCB) 6. The insertion members 23 are respectively inserted into corresponding sections (not shown) of the PCB 6, in this embodiment, the insertion members 23 are further soldered to the PCB 6 for fixedly locating the battery connectors 2, 3 to the PCB 6. The mounting faces 201 of the two substantially same battery connectors 2, 3 are engaged with two opposite sides of the PCB 6. A first and a second substantially same batteries 4, 5 respectively connect with the mating surfaces 208 of the battery connectors 2, 3. The contacting portion 213 of the terminal 21 electrically connects with the contacting portion 222 of the detecting contact 22 at an initial position.

When the battery currently in use, for example the first battery 4, is down to 10% of its power level, a personal digital assistant (PDA) detects this and switches over to the fully charged second battery 5 through software and electronics. After switching to the new battery 5 the operating system sends a message to the screen to say that the battery 4 needs to be replaced and recharged. If a user now removes the battery 4, the terminal 21 of the battery connector 2 will disconnect from the contacting portion 222 of the detecting contact 22 before the apexes 214 of the terminals 21 disconnect from the battery 4. At the same time, the PDA will send a message to the screen to say it is correct. In this situation, the user may proceed to remove the battery 4. However, if the user tries to remove the battery 5 by mistake, the terminal 21 of the battery connector 3 will disconnect from the contacting portion 222 of the detecting contact 22 before the apexes 214 of the terminals 21 disconnect from the battery 5, and at the same time, the PDA will send a video message to the screen or an audio alarm to warn the user that he/she is removing the wrong battery and running the risk of losing data. Then the user may retroactively have time and opportunity to put the good battery 5 back in, and to instead remove the battery 4 correctly.

Figure 4:
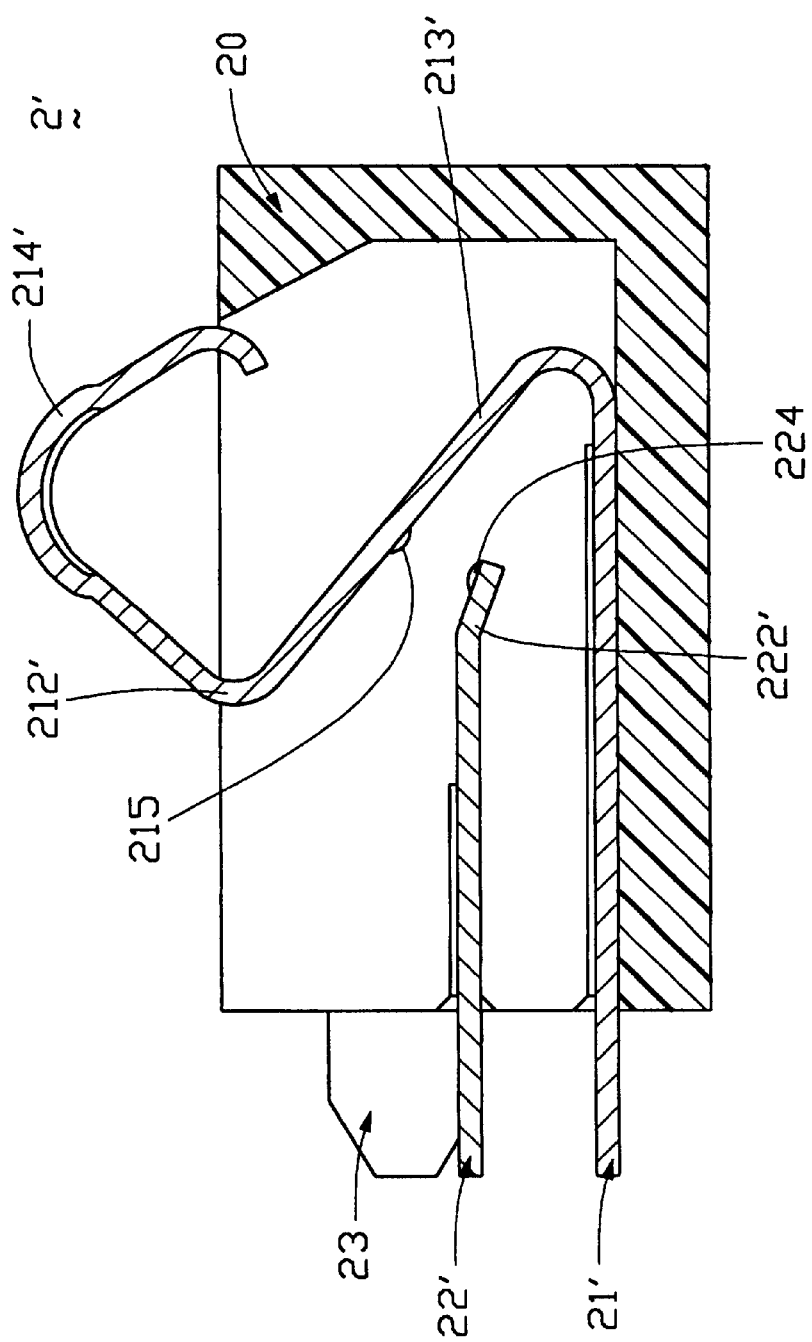
FIG. 4 is a section view of a battery connector of another embodiment in accordance with the present invention.

In a second embodiment as shown in FIG. 4, another plurality of terminals 21' and detecting contact 22' are provided to embody the spirit of the present invention. The distinction between the first and second embodiments lies at each terminal 21' reversely extends out of the housing 20 and has a curved portion 212' reversely formed thereof. Each curved portion 212' has an apex 214' on an upper portion thereof and a contacting portion 213' on a lower section thereof. The contacting portion 213' has a dome 215 downwardly and outwardly formed on a lower surface thereof. A contacting portion 222' is bent down from a rear end of the detecting contact 22' and has a dome 224 upwardly formed on an upper surface thereof.

In use, as recited above, the dome 215 of the contacting portion 213 of the terminal 21 electrically connects with the dome 224 of the contacting portion 222 of the detecting contact 22 at an initial position. If the user removes the battery 4, the dome 215 of the terminals 21 of the battery connector 2 disconnects with the dome 224 of the detecting contact 22 before the apexes 214 of the terminals 21 disconnecting from the battery 4, the same to the battery 5.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery connector adapted for detecting whether a battery connected therewith is about to be removed correctly, comprising:

an insulative housing having a plurality of passageways therein;

a plurality of terminals each having an engaging portion received in a corresponding passageway and a curved portion extending out of the housing; and a detecting contact received in the housing, the detecting contact having an engaging portion and a contacting portion, the contacting portion electrically connected with the curved portion of a corresponding terminal during normal use of the battery and, when the battery is about to be removed, the corresponding terminal disconnecting from the contacting portion of the detecting contact before the terminals disconnect from the battery;

wherein the housing defines a pair of slots extending in opposing lateral sidewalls of an associated passageway for receiving said detecting contact.

2. The battery connector in accordance with claim 1, wherein the curved portion has an apex for connecting with the battery and a contacting portion at an end portion thereof for connecting with the detecting contact.

3. The battery connector in accordance with claim 1, wherein the detecting contact is planar.

4. The battery connector in accordance with claim 1, further comprising a plurality of insertion members, and wherein the housing comprises a mounting surface at a front thereof and a plurality of holes exposed to the mounting surface for receiving the insertion members.

5. The battery connector in accordance with claim 4, wherein each of the terminals and the detecting contact has a soldering portion at a front end of the engaging portion extending beyond the mounting surface of the housing.

6. The battery connector in accordance with claim 1, wherein the contacting portion of the detecting contact is bent down from a rear end of the engaging portion and has a first dome thereon for connecting with the associated terminal.

7. The battery connector in accordance with claim 6, wherein the curved portion reversely extends out of the housing and comprises a contacting portion having a second dome thereon for connecting with the first dome of the detecting contact.

8. A power supply assembly adapted for mounting on a printed circuit board (PCB), comprising:

a first and a second rechargeable batteries which are substantially the same;

a first and a second battery connectors respectively connecting with the first and the second batteries, each battery connector having a detecting contact and a plurality of terminals each having a curved portion extending out, the detecting contact electrically connected with the curved portion of a corresponding terminal during normal use of the battery and, when the battery is about to be removed, the corresponding terminal disconnecting from the detecting contact before the terminals disconnect from the battery;

wherein the first battery connector comprises an insulative housing having a plurality of passageways therein for receiving the terminals and a pair of slots extending in opposing lateral sides of each passageway for receiving said detecting contact.

9. The power supply assembly in accordance with claim 8, wherein the first and second battery connectors are substantially the same and respectively mounted on opposite sides of the PCB.

10. The power supply assembly in accordance with claim 8, wherein each terminal and the detecting contact have a soldering portion at a front end thereof extending beyond the housing.

11. The power supply assembly in accordance with claim 8, wherein each terminal comprises a curved portion extending out of the housing and having an apex thereon for connecting with the battery and a contacting portion at an end portion thereof for connecting with the detecting contact.

12. The power supply assembly in accordance with claim 11, wherein the detecting contact comprises an engaging portion and a contacting portion in a same plane of the engaging portion for connecting with the contacting portion of the associated terminal during normal use of the battery.

13. The power supply assembly in accordance with claim 8, wherein each terminal comprises a curved portion reversely extending out of the housing and having a contacting portion forming a first dome thereon.

14. The power supply assembly in accordance with claim 13, wherein the detecting contact has a contacting portion bent at a rear end of the engaging portion and having a second dome on an upper surface thereof for connecting with the first dome on the contacting portion of the terminal.

15. A connector assembly comprising:

an insulative housing defining a plurality of passageways therein;

a plurality of terminals received within the corresponding passageways therein, respectively, each of said terminals including a planar engaging portion retaining the terminal in the housing and a curved portion extending from the engaging portion and out of the housing;

at least one detecting contact sharing one passageway with one corresponding terminal, said detecting contact spatially positioned, in a direction, between the curved portion and the engaging portion of said corresponding terminal; and an electronic device with electrodes thereon engaging the terminals along said direction; wherein the detecting contact engages the corresponding terminal when said electronic device is fully mated with the housing, while is disengaged from the corresponding terminal before said electronic device is disengaged from said corresponding terminal when said electronic device is leaving said housing in another direction opposite to said direction.

\* \* \* \* \*